Patented Feb. 18, 1947

2,416,262

UNITED STATES PATENT OFFICE 2,416,262

HALOHYDRIN REACTED AROMATIC AMINE POLYMER

Samuel S. Kistler, West Boylston, Mass., assignor to Norton Company, Worcester, Mass., a corporation of Massachusetts No Drawing. Original application September 17, 1941, Serial No. 411,249. Divided and this application April 18, 1944, Serial No. 531,651

7 Claims. (Cl. 260—72)

This invention relates to resinous compositions and methods of making the same.

This application is a division of my copending application Serial No. 411,249, filed September 17, 1941, which was a continuation in part of a copending application Serial No. 318,004, filed February 8, 1940, which in turn was a division of my prior application Serial No. 306,545, filed November 28, 1939, and patented February 10, 1942, No. 2,272,873.

One object of the invention is to provide a new type of resin.

Another object of the invention is to provide a resin capable of general use as well as for a bond for the manufacture of grinding wheels and other abrasive bodies.

Another object of the invention is to provide an aniline aldehyde type of resin which has an ingredient capable of causing additional curing thereof when heated.

Another object of the invention is to provide a method of improving an aniline formaldehyde polymer.

Other objects will be in part obvious or in part pointed out hereinafter.

According to this invention, I have provided resinous compositions, and particularly polymeric resinous compositions comprising the reaction product of a halogenated organic compound, an aliphatic halohydrin, or of such a halogenated organic compound and an aldehyde, such as formaldehyde or furfural, with the condensation product of an aldehyde and a primary aromatic amine. The halogenated organic compound alkylates the amino nitrogens of the aldehyde-amine condensation product, typically forming an alkylene or substituted alkylene cross-link between nitrogen atoms of adjacent molecules of the condensation product. Halohydric acid from the halogenated compound adds on to at least a portion of the nitrogen atoms to form halohydric salt combinations therewith. When an aldehyde is also reacted with the aldehyde-amine condensation product, further cross-linkages are formed, typically linking aromatic rings of adjacent molecules of the condensation product with methylene or substituted methylene radicals attached to the carbon atom of the aromatic ring adjacent to the amino nitrogen linkage of the condensation product. The reaction products thus obtained are particularly useful as the bond for abrasive articles.

I provide a quantity of a primary aromatic amine, such as aniline, meta phenylene diamine, meta toluidine, or diamino diphenyl methane; a quantity of an aldehyde, such as formaldehyde or furfural; and an organic compound containing a halogen selected from the group consisting of chlorine and bromine and capable of splitting off hydrogen halide at elevated temperatures and/or of alkylating an aromatic amine polymer, providing cross links connecting amine groups of the chains. The aromatic amine which I now prefer to use is aniline. According to the invention, aniline

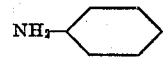

or other primary aromatic amine is reacted with formaldehyde, HCHO, or with furfural

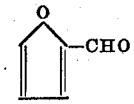

in the presence of a strong acid to produce a long chain polymer which, when an excess of formaldehyde or furfural above the stoichiometric proportions is used, for example 20% excess, has adjacent chains connected with methylene, —CH$_2$—, or substituted methylene groups to form a tough, heat resistant, semi-thermoplastic resin. I may add some of the aldehyde after the initial condensation, and my invention clearly contemplates that one aldehyde may be used at one stage, and a different aldehyde may be used at another stage.

As examples of the halogenated organic compound, I may use any aliphatic halohydrin of not more than five carbon atoms, such as any of the amylene chlorohydrins, propylene chlorohydrin, any of the butylene chlorohydrins, ethylene chlorohydrin, ethylene bromohydrin, glycerol alpha gamma dichlorohydrin. Most of the examples are chlorinated compounds because these are cheaper and more readily available than the brominated compounds, but the latter gives effective results. The fluorinated compounds are rejected because they are too stable and will not alkylate the polymer nor provide hydrogen halide for reaction at the grinding line of a grinding wheel.

I believe that the novel resin of the invention has utility for many purposes, such as for the manufacture of many types of molded articles, and especially for use as the binder for sandpaper or abrasive cloth, and for abrasive discs, and for the adhesive for abrasive coated polishing wheels such as are referred to as "set-up wheels." However, the principal use of the resin of my invention is for the bond of grinding wheels, and other solid abrasive articles, such as segments, sectors, honing sticks and the like. Accordingly, whereas it should be understood that the resin may be formed without abrasive filler, or with any other filler, such as sawdust, graphite, carbon, asbestos, cloth or quartz, in the examples I shall describe the manufacture of grinding wheels. The technique for manufacturing other solid abrasive articles is substantially the same.

I, therefore, provide a quantity of abrasive grain. Any abrasive grain may be used, for example, any of the varieties of alumina, such as emery, corundum, dense "regular" fused alumina, porous fused alumina, silicon carbide, and other hard carbides, quartz, glass, garnet or diamonds. Considering now specific examples of the manufacture of grinding wheels in accordance with the present invention, I may proceed as follows:

Example I

Eight hundred and fifty-eight cubic centimeters of aniline is dissolved in eight liters of water containing nine and three-tenths mols of hydrochloric acid. To this is added eight hundred and fifty cubic centimeters of formalin solution containing four tenths gram of formaldehyde per cubic centimeter. After standing for one hour a quantity of sodium hydroxide is added equivalent to the hydrochloric acid present. The precipitated resin is filtered, washed, dried, and ground to a fine powder. Into each ten pounds of this powdered resin I mix two and two-tenths pounds of ethylene chlorohydrin.

Twenty-eight and one tenth pounds of a porous, relatively pure grade fused alumina abrasive, No. 20 grit size, is now wet with twenty-three hundredths of a pound of furfural. Five and nine-tenths pounds of the above mixture of aniline formaldehyde resin and the ethylene chlorohydrin are intimately mixed with the fused alumina wet with furfural, spread in an eighteen inch mold with a five inch arbor, and hot pressed for one hour and a half at a temperature of 160° C. under a pressure of three tons per square inch. The wheel is then stripped from the mold.

As conducive to a clearer understanding of the present invention I believe that a typical structural formula of the resin thus produced is as follows:

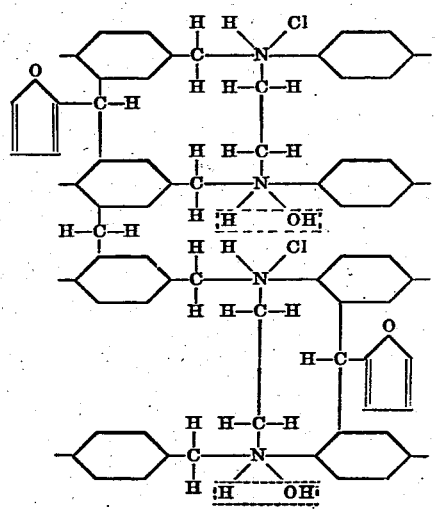

The above is the modified polymer formed when ethylene chlorohydrin is used. It will be noted that the nitrogen atoms of the secondary amine groups are connected by the ethylene chlorohydrin. Hydrogen chloride is found attached to some of the secondary amine groups. Other secondary amine groups have lost the elements of water. Furyl methylene groups are shown connecting some of the points on the benzene rings ortho to the secondary amine groups. These furyl methylene groups were derived from the furfural used to plasticize the abrasive grain. Naturally if enough furfural is used all of these ortho points will be connected, while if less than the saturating amount is used, only some of the ortho points will be connected. These furyl methylene groups forming connecting links add strength to the resin. If furfural, however, was used to condense the aniline formaldehyde, furyl rings would substitute for one of the hydrogen atoms on the connecting methylene groups.

As a subexample within the general framework of Example I, if glycerol alpha gamma dichlorohydrin be substituted for the ethylene chlorohydrin, approximately the following structure may result:

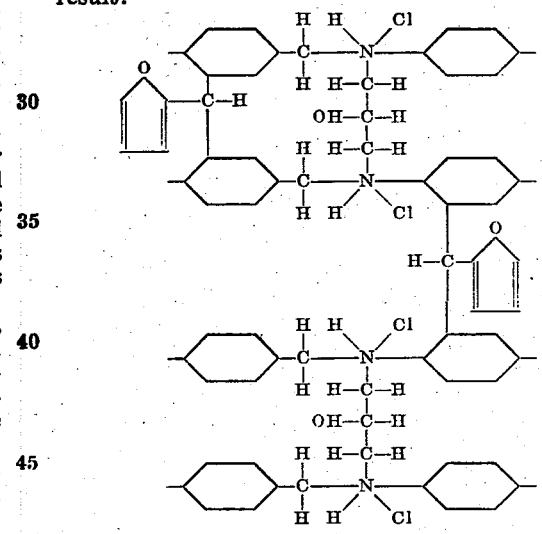

Thus it will be seen that if ethylene bromohydrin is used (in sufficient quantity) one-half of the secondary amine groups will have hydrogen bromide attached to them and the other half of the secondary amine groups will have elements of water attached to them. If any of the alpha butylene chlorohydrin, beta butylene chlorohydrin, propylene chlorohydrin or any of the amylene chlorohydrins are used, in sufficient quantity, one half of the secondary amine groups will have hydrogen chloride attached to them and the other half of the secondary amine groups will have the elements of water attached to them. Also in the case of these last named compounds the connecting halohydrin groups will be branched because the amino groups attach to the carbon atoms having halogen attached and also having hydroxyl attached.

These compounds have the property of giving off hydrogen chloride (or hydrogen bromide) when heated to a temperature of 500° C. When the temperature drops far below that point they no longer give up the hydrogen halide.

Example II

Thirty-seven pounds of No. 14 mesh fused alumina abrasive is placed in a mixing pan and wet with five hundred and forty cubic centimeters of furfural. To this are added nine pounds of the resin and halohydrin mixture of Example I and two pounds of cryolite. Further mixing is caused and then the mixture thus produced (which is substantially what is called a dry granular mix) is spread in a sixteen inch mold with a six inch arbor and hot pressed for two hours at a temperature of 160° C. and under a pressure of five hundred tons. Such a wheel will give as good a finish on stainless steel as a rubber wheel but is much more durable.

It may be noted at this point that cold pressing can be resorted to by reason of the plasticizing of the abrasive grains with furfural. However, the results are not as satisfactory as when the hot pressing method is used. Furthermore, the addition of furfural definitely increases the plasticity of the mix and provides a better product when hot pressed.

*Example III*

Eight hundred and fifty-eight cubic centimeters of aniline were dissolved in eight liters of water containing nine and three-tenths mols of hydrochloric acid. To this was added seven hundred and fifty cubic centimeters of formalin solution containing four-tenths grams of formaldehyde per cubic centimeter. After standing for one hour, a quantity of sodium hydroxide was added equivalent to the hydrochloric acid present. The precipitated resin was filtered, washed, dried and ground to a fine powder.

Eight hundred and eighty-five grams of 60 mesh fused alumina is mixed dry with one hundred and sixty grams of the powdered resin and forty-nine grams of amylene chlorohydrin. This mixture is spread in an eight inch mold and pressed at a temperature of 175° C. under a pressure of one hundred and fifty tons for half an hour. This constitutes a grinding wheel the resin bond of which is hard, tough and heat resistant. This bond likewise during grinding liberates hydrogen chloride at the grinding line.

*Example IV*

Eight hundred and eighty-five grams of 60 mesh fused alumina is wet with twenty-two cubic centimeters of furfural. To the thus wet abrasive grain are added one hundred and sixty grams of the powdered resin from Example III and fifty grams of ethylene bromohydrin. This mixture is spread in an eight inch mold and pressed at a temperature of 175° C. under a pressure of one hundred and fifty tons for half an hour. This wheel has characteristics similar to the wheels of the other examples.

*Example V*

Ten hundred and seventy grams of meta toluidine, $CH_3C_6H_4NH_2$, is dissolved in eight liters of water containing ten mols of hydrochloric acid. To this solution is added eight hundred and fifty cubic centimeters of forty per cent formalin. After standing one hour, a quantity of sodium hydroxide is added equivalent to the hydrochloric acid used. The precipitated resin is filtered, washed, dried, and ground to a fine powder.

Eight hundred and eighty-five grams of 60 mesh fused alumina is first wet with thirty cubic centimeters of furfural. Then one hundred and sixty grams of the powdered resin from Example V and twenty grams of propylene chlorohydrin are added and mixed to produce a dry granular mix. This mixture is spread in an eight inch mold and pressed under a pressure of two hundred tons then stripped from the mold and the "green" wheel is baked in an autoclave at a pressure of seven atmospheres at a temperature gradually rising to 175° C. and maintained at this temperature for three hours. The structure of the resin may be represented as follows:

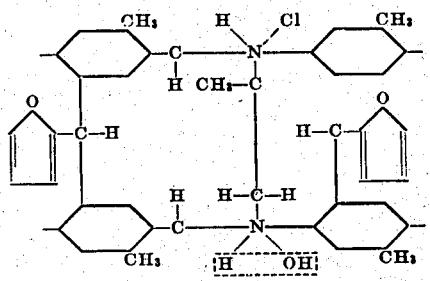

Interpreting the foregoing diagrams, it must be understood that an approximate condition is what is illustrated. It would be impossible to illustrate all of the linkages. Furthermore, for an absolutely accurate representation, a three dimensional structure would have to be represented.

For the acid used in condensing the resin, besides hydrochloric and phosphoric acids, any of the following acids or many others may also be used:

Hydriodic acid
Tri-chloro acetic acid
Di-chloro acetic acid
Maleic acid
Oxalic acid
Sulphuric acid The requirement is that the acid should be at least as strong as phosphoric acid to give the best results.

Considering now the various features of this invention, when aniline is condensed with formaldehyde in the presence of a strong acid, we may have the following resin structure:

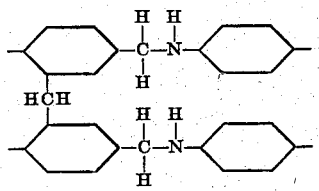

When furfural is used to condense the aniline, we may have the following resin structure:

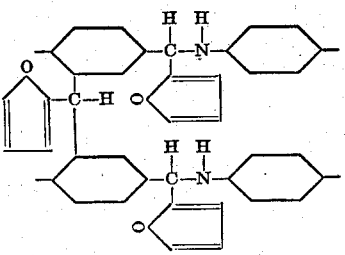

In each of the above cases the use of enough aldehyde to cross link has been assumed. Similar structural formulae may be written for meta toluidine, meta phenylene diamine and diamino diphenyl methane. When furfural is substituted in whole or in part for formaldehyde for the original condensation process, a furyl group will be found replacing one hydrogen atom attached to the carbon of some of the methylene groups connecting the amino groups to the opposite ring. It will be seen that it is more advantageous to plasticize the abrasive grains with furfural because thereby a number of additional linkages are provided in the polymeric structure, making it stronger.

It may be noted at this point that cold pressing can be resorted to by reason of the plasticizing of the abrasive grains with furfural. However, the results are not as satisfactory as when the hot pressing method is used. Furthermore, the addition of furfural definitely increases the plasticity and provides a better product when hot pressing.

The reaction of the halogenated organic compound with the condensation product appears to cross link and alkylate the condensation product at the amino groups and it is believed that typical resinous products of the invention may be represented by the following general structural formula, which is repeated in a complex chain:

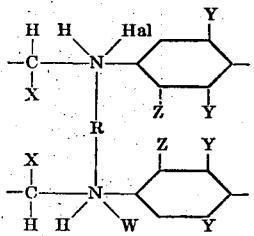

wherein X is selected from the group consisting of H and

Y is selected from the group consisting of H, $NH_2$ and $CH_3$, Hal is selected from the group consisting of Cl and Br, R is a bivalent radical selected from the group consisting of alkylene radicals, halogenated alkylene radicals, and hydroxylated alkylene radicals, the adjacent Z's may be hydrogen or a methylene or furyl bridge between adjacent benzene rings, and W represents a radical selected from the group consisting of Cl, Br and OH.

While I have mentioned specific curing temperatures, it should be understood that the upper limit is determined only by the decomposition point of the resin. Temperatures short of 190° C. are safe. At the lower end, almost any temperature can be used but preferably above 60° C. but the lower the temperature, the more time to carry the reaction to completion. Practical results can be obtained with temperatures above 90° C.

The percentage of the propylene chlorohydrin to the reactants including the propylene chlorohydrin in Example V is 9.31%. The percentage of the amylene chlorohydrin to the reactants including the amylene chlorohydrin in Example III is 23.44%. The percentage in Example V is the lowest percentage of all of the examples and the percentage in Example III is the highest percentage of all of the examples, so therefore the range of about 9.31% to about 23.44% is used in the claims.

It will thus be seen that there has been provided by this invention a composition of matter, an article of manufacture, and an art in which the various objects hereinabove set forth together with many thoroughly practical advantages are successfully achieved. As various possible embodiments might be made of the features of the above invention and as the art herein described might be varied in various parts, all without departing from the scope of the invention, it is to be understood that all matter hereinbefore set forth is to be interpreted as illustrative and not in a limiting sense.

I claim:

1. A halogenated cross linked aromatic amine polymer consisting of a condensation product of one molecular proportion of primary aromatic amine selected from the group consisting of aniline, meta phenylene diamine, meta toluidine and diamino diphenyl methane and at least one molecular proportion of aldehyde selected from the group consisting of formaldehyde and furfural, condensed in the presence of at least approximately one molecular proportion of acid at least as strong as phosphoric acid and reacted by heating at resin curing temperatures with from about 9.31% to about 23.44% on the weight of the reactants of an aliphatic halohydrin containing from 2 to five carbon atoms and wherein the halogen is selected from the group consisting of chlorine and bromine.

2. A halogenated cross linked aromatic amine polymer consisting of a condensation product of one molecular proportion of aniline and at least one molecular proportion of aldehyde selected from the group consisting of formaldehyde and furfural, condensed in the presence of at least approximately one molecular proportion of acid at least as strong as phosphoric acid and reacted by heating at resin curing temperatures with from about 9.31% to about 23.44% on the weight of the reactants of an aliphatic halohydrin containing from 2 to five carbon atoms and wherein the halogen is selected from the group consisting of chlorine and bromine.

3. A halogenated cross linked aromatic amine polymer consisting of a condensation product of one molecular proportion of primary aromatic amine selected from the group consisting of aniline, meta phenylene diamine, meta toluidine and diamino diphenyl methane and at least one molecular proportion of formaldehyde, condensed in the presence of at least approximately one molecular proportion of acid at least as strong as phosphoric acid and reacted by heating at resin curing temperatures with from about 9.31% to about 23.44% on the weight of the reactants of an aliphatic halohydrin containing from 2 to five carbon atoms and wherein the halogen is selected from the group consisting of chlorine and bromine.

4. A halogenated cross linked aromatic amine polymer consisting of a condensation product of one molecular proportion of aniline and at least one molecular proportion of aldehyde consisting at least in part of formaldehyde, condensed in the presence of at least approximately one molecular proportion of acid at least as strong as phosphoric acid and reacted by heating at resin curing temperatures with from about 9.31% to about 23.44% on the weight of the reactants of an aliphatic halohydrin containing from 2 to five carbon atoms and wherein the halogen is selected from the group consisting of chlorine and bromine.

5. A halogenated cross linked aromatic amine polymer according to claim 1 in which the aliphatic halohydrin is an ethylene halohydrin and in which the halogen is selected from the group consisting of chlorine and bromine.

6. A halogenated cross linked aromatic amine polymer according to claim 1 in which the aliphatic halohydrin is an amylene halohydrin and in which the halogen is selected from the group consisting of chlorine and bromine.

7. A halogenated cross linked aromatic amine polymer according to claim 1 in which the aliphatic halohydrin is a propylene halohydrin and in which the halogen is selected from the group consisting of chlorine and bromine.

SAMUEL S. KISTLER.

REFERENCES CITED

The following references are of record in the file of this patent:

UNITED STATES PATENTS

| Number | Name | Date |
|---|---|---|
| 1,969,744 | Gams | Aug. 14, 1934 |
| 2,038,142 | Sutter | Apr. 21, 1936 |
| 2,197,357 | Widmer (1) | Apr. 16, 1940 |
| 2,331,446 | Widmer (2) | Oct. 12, 1943 |

FOREIGN PATENTS

| Number | Country | Date |
|---|---|---|
| 820,969 | French | Aug. 9, 1937 |
| 564,525 | German | Nov. 19, 1932 |